United States Patent Office 3,120,269
Patented Feb. 4, 1964

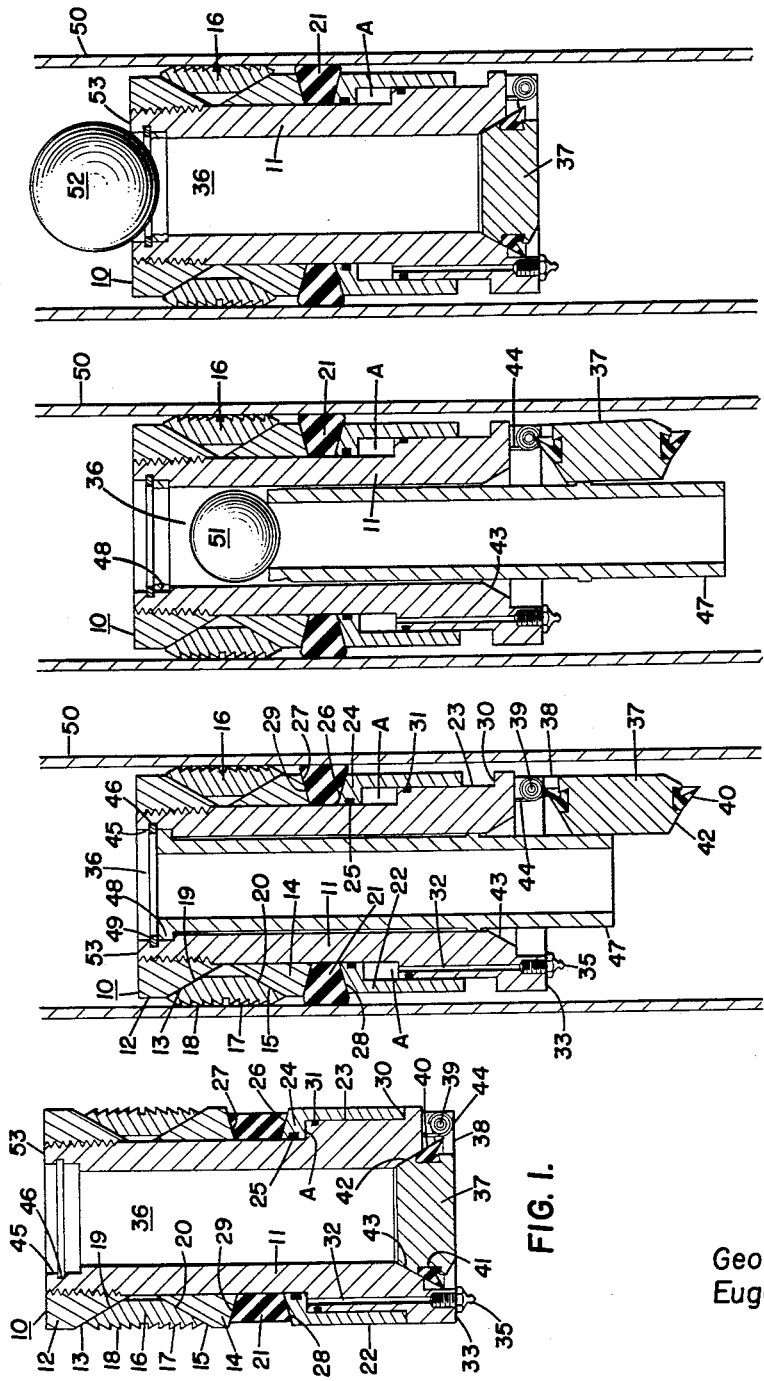

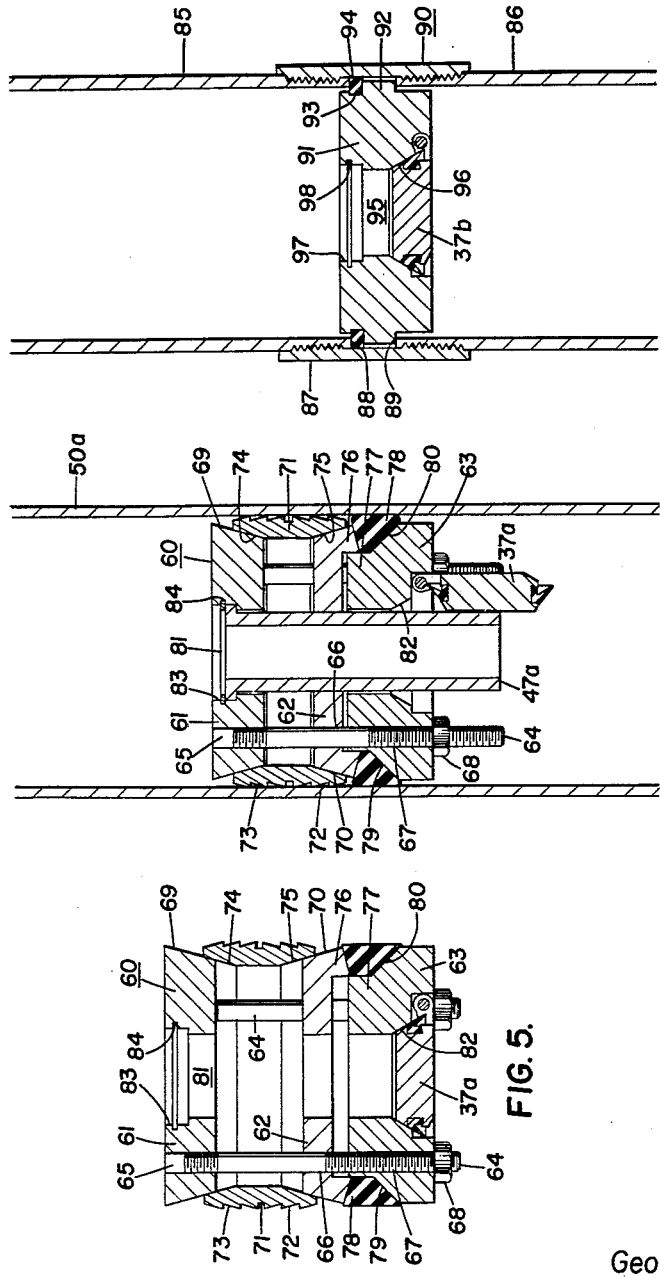

3,120,269
INSERT PACKER TYPE EQUIPMENT
George W. Evans and Eugene E. Baker, Duncan, Okla., assignors to Halliburton Company, a corporation of Delaware
Filed May 4, 1959, Ser. No. 810,650
3 Claims. (Cl. 166—120)

This invention relates generally to insert type equipment useful with tubular members and, more particularly, to equipment that may be placed and securely held in the interior of a tubular member, such as a section of pipe, tubing or casing, and run therewith into an oil or gas well or the like.

In oil field operations it has been common practice in the past to attach insert type casing equipment to the well casing by the use of either threads or welding or both. These procedures are ordinarily limited by practical necessity to use only at the extreme ends of the casing, such as with float, guide, or fill-up shoes, or at the connection between two lengths of the casing, such as with float, guide, or fill-up collars.

Due to the large variety of different threads encountered on oil well casing, manufacturers and suppliers of casing equipment have heretofore been required to stock a large number of shoes and collars of the same size that differ only in the threads used for attaching them to the casing. The problem has been further complicated by the variations in sizes of the casings used.

In addition to employing threaded connections, some operators have attempted to improve the connections by also welding the equipment to the casing, thereby preventing the threads from becoming inadvertently or otherwise loosened during use. However, welding has several disadvantages. For one thing, it is oftentimes difficult to obtain a predictable weld, particularly since oil well casings are of generally unknown chemical composition. Another disadvantage inherent in welding is that it results in locations of stress concentration which are particularly undesirable in the high strength casings used in the extremely deep wells now being drilled.

A general object of the present invention is to provide improved insert type equipment for use with tubular members, such as well casing or the like.

Another object of the invention is to provide improved insert type equipment adapted to be securely mounted at any accessible location within a tubular member, such as at any of various locations within a section of well casing or the like, without the necessity of welding or threadedly connecting the equipment to the casing.

A more specific object of the invention is to provide improved insert type equipment adapted to be securely mounted within a string of well casing or the like prior to the running or lowering thereof into a well and without the necessity of using either welded or threaded connections between the equipment and the surrounding casing wall.

Another specific object of the invention is to provide an improved insert type float valve for use with well casing or the like.

Another specific object of the invention is to provide an improved insert type fill-up device for use with well casing or the like.

A further specific object of the invention is to provide an improved insert type bridge plug for use with well casing or the like.

The invention involves the concept of apparatus or equipment for insertion in a well casing or other hollow or tubular member prior to the running thereof into a well, the equipment including flexible packing means deformable into engagement with the tubular member and holding means engageable with the tubular member to provide additional support tending to prevent relative movement of the assembly therein. The flexible packing means may be made of rubber or a rubber-like material which, upon longitudinal compression thereof, is expansible or deformable into close sealing engagement with a surrounding surface. The additional support may be provided by rigid holding members, such as metal slips, which are moved radially outward into relatively fixed engagement with the tubular member. In one arrangement, hydraulic means is provided for both setting or deforming the packing means and setting or moving the holding means or slips into engagement with the surrounding tubular member. In another arrangement which may be employed, if desired, mechanical means is provided for setting both the packing means and holding means or slips. In yet another arrangement, the additional rigid support is provided without employing movably mounted members or slips.

The insert type equipment is preferably constructed and arranged whereby adjustment or modification thereof to function as any of a variety of devices is permitted. For example, the equipment may be constructed and arranged to function in well casing as an insert type float valve, fill-up device, bridge plug, or any of these, such as by simply adding or removing parts and without the necessity of making major changes or modifications.

The foregoing and additional objects and advantages of the invention will become more apparent from the following description when read in conjunction with the accompanying drawing wherein similar reference characters denote similar parts in all views and wherein:

FIGURE 1 is a sectional view of a float valve device having the invention incorporated therein, the device being adapted to be hydraulically operated to securely mount it in a tubular member.

FIGURE 2 is a sectional view of the float valve device of FIGURE 1 with an optional fill-up tube shown inserted therein, the device being shown after being hydraulically set in a section of well casing.

FIGURE 3 is a sectional view similar to that of FIGURE 2, but illustrating the method of removing the fill-up tube, such as after lowering the casing and inserted device into a well.

FIGURE 4 is a sectional view of the device of FIGURE 1 illustrating its use in a well as a bridge plug or baffle.

FIGURE 5 is a sectional view of another form of float valve device also in accordance with the invention, the device being adapted to be mechanically set in a well casing.

FIGURE 6 is a sectional view of the float valve device of FIGURE 5 with an optional fill-up tube shown inserted therein, the device being shown after being mechanically set in a section of well casing.

FIGURE 7 is a sectional view of yet another form of float valve device also in accordance with the invention, the device being shown retained in a collar or coupling joining two sections of a well casing.

Referring first to FIGURE 1, an insert type float valve device 10 is there shown as including a tubular body 11 having an upper expander 12 threadedly fixed to the upper exterior side wall thereof. The expander 12 has a downwardly and inwardly tapered lower surface 13.

A lower expander 14 is slidably mounted on the tubular body 11 below the upper expander 12. The lower expander 14 has an upwardly and inwardly tapered upper surface 15.

A set of segmental slips 16 preferably having both upwardly biting teeth 17 and downwardly biting teeth 18 is disposed around the body 11 between the upper and lower expanders 12 and 14. The slips 16 are provided with inwardly convergent tapered surfaces 19 and 20 which are companion surfaces, respectively, to the tapered surfaces 13 and 15 on the upper and lower expanders 12 and 14.

A resilient and expansible packing member 21 of generally cylindrical shape encircles the body 11 and is slidably mounted thereon below the lower expander 14. Below the packing member 21 is a slidable sleeve 22 which encircles a lower raised portion 23 of the body 11. The sleeve 22 is provided with an inwardly projecting upper end portion 24 which is disposed above the body raised portion 23. The end portion 24 preferably carries a suitable sealing means, which as O-type sealing ring 25, which is disposed in slidably sealing relation to the body 11. A fluid chamber A (see FIGURE 2) is thus provided between the body 11 and sleeve 22.

If desired, the sleeve 22 may be provided at its upper end with an upwardly and inwardly tapered surface 26 and the lower expander 14 may be provided at its lower end with an inwardly and downwardly tapered surface 27, as shown. The tapered surfaces 26 and 27 are thus inwardly convergent and are cooperable with preferably companion surfaces 28 and 29 provided on the packing member 21 at the opposite ends thereof.

The body 11, near its lower end, is provided with a shoulder 30 which is adapted to engage the lower end of the sleeve 22 and limit downward movement thereof along the body 11. A suitable sealing means, such as an O-type sealing ring 31, shown preferably located near the upper end of the raised portion 23 of the body 11, provides a fluid-tight seal between such portions 23 and the interior surface of the sleeve 22.

The body 11 has an interior passageway 32 shown extending from its bottom surface 33 upwardly through its raised portion 23. The upper end of the passageway 32 communicates with the fluid chamber A (see FIGURE 2). The lower end of the passageway 32 is provided with a normally closed check valve 35, such as a zerk fitting. Thus, fluid may be introduced through the valve 35 and passageway 32 into the chamber A, whereupon the valve 35 prevents return flow of the fluid in a downward direction out of the passageway 32.

It will be noted that a main fluid passageway 36 extends axially through the entire body 11. Fluid flow through this main passageway 36 is controlled by fluid flow control means which, in the arrangement of FIGURE 1, is a normally closed valve means located near the lower end of the passageway 36. The normally closed valve means is adapted to permit fluid to pass in a downwardly direction but prevent the passage of fluid in an upwardly direction through the passageway 36 when the float valve device 10 is set in place within a tubular member.

As illustrated, the normally closed valve means is in the form of a flapper valve 37 which is hingedly affixed to the body 11 at the lower end thereof. The valve 37 includes a disc-like body portion having hinge lugs 38 which project outwardly and into a notched portion of the body 11 to which the lugs 38 are suitably secured, such as by a hinge pin 39 shown extending through openings suitably provided therefor in the lugs 38 and the body 11.

A sealing member 40 is carried by the valve 37, the member 40 being shown in the form of an annular sealing ring mounted in a recess 41 which extends circumferentially about the body portion of the valve 37. Above the recess 41, the body portion of the valve 37 is provided with a generally frusto-conical surface 42 having a flexible lower extension which is provided by the outer surface of the sealing member 40. On the body 11, there is a frusto-conical surface 43 which encircles the main passageway 36 extending through the body 11.

The valve 37 is urged toward its normally closed position by the action of a spring 44 which is shown fitted to the hinge pin 39 so as to cooperate with surfaces on the body 11 and valve 37 and thereby apply force tending to move the frusto-conical surface 42 on the valve 37 into sealing engagement with the companion surface 43 surrounding the lower end of the passageway 36.

It will be noted in FIGURE 1 that a counterbore 45 is provided in the upper portion of the main passageway 36. There is a circumferential recess 46 suitably located in the counterbore 45.

In FIGURE 2, the device 10 is shown fitted with an optional fill-up tube 47 which is releasably mounted in the main passageway 36. The fill-up tube 47 includes a hollow cylindrical body portion having a narrow circumferential flange 48 near its upper exterior end. The tube 47 may be made of any suitable material, such as a plastic, metal, or metal-like substance depending upon the operating conditions. Also, the hollow tube 47 may be selected, particularly as to its inside diameter, to provide any of a variety of desired fluid flow capacities therethrough, such as to restrict the flow of fluid through the device 10 when set in place within a tubular member.

In fitting the fill-up tube 47 within the passageway 36, the tube is inserted therein from above until the lower portion of the flange 48 on the tube 47 is disposed adjacent the bottom of the counterbore 45. A lock ring 49 is then inserted into the recess 46 in the counterbore 45, the inner portion of the ring 49 projecting out of the recess 46 so as to retain the tube 47 in place. It will be noted that the tube 47, when in place, extends downwardly through the main passageway 36 and out of the lower end of the body 11, thus holding the flapper valve 37 in its open position.

In FIGURE 2 the float valve device 10 is shown after being hydraulically set in a section of well casing 50. It is understood that the device 10 may be mounted in a section of the casing 50 prior to the string of casing 50 being run into an oil or gas well or the like. Thus, the device 10 may be mounted at practically any desired location in the string. However, for most applications, it is believed that the device 10 will be most conveniently mounted at a location relatively near the end of one of the sections of the casing 50.

In setting or expanding the valve device 10 at a location in the casing 50, suitable means for supplying pressurized fluid into the interior passageway 32 is needed. This may conveniently be a grease gun (not shown), which may be releasably attached to the check valve 35. Fluid is then forced through the check valve 35 and passageway 32 into the chamber A, thereby applying force to the inside of the slidable sleeve 22. This force causes the sleeve 22 to move upwardly. Since the packing member 21 and the lower expander 14 are each slidably mounted, they tend to also move upwardly toward the fixed upper expander 12.

As the lower expander 14 moves upwardly, the tapered surfaces 19 and 20 on the slips 16 slide along the companion surfaces 13 and 15 provided on the expanders 12 and 14, respectively. As a result, the slips move radially outward, forcing the teeth 17 and 18 into biting engagement with the interior of the casing 50. It will be noted that the upwardly biting teeth 17 resist or prevent relative upward movement of the device 10 in the casing 50 while the downwardly biting teeth 18 resist or prevent relative downward movement of the device 10 therein.

When the slips 16 are firmly engaged with the casing 50, the lower expander 14 is then substantially fixed against further upward movement along the body 11. Continued upward movement of the sleeve 22 then deforms the packing member 21 by compressing it between the bottom tapered surface 27 of the lower expander 14 and the top tapered surface 26 of the sleeve 22. The supplying of pressurized fluid to the passageway 32 is continued, as aforesaid, until the packing member 21 is deformed or radially expanded into fluid-tight sealing engagement with the interior of the casing 50.

After the slips 16 and the packing member 21 have been fully set or expanded, as aforesaid, the grease gun (not shown) is detached from the check valve 35. Thereafter, the check valve 35 prevents fluid flow out of the passageway 32, thereby maintaining the sleeve 22 in its upward position and retaining the device 10 securely mounted in the section of casing 50.

The casing section having the insert device 10 therein is then coupled in the conventional manner to other sections of the casing 50 for running into a well. As the casing 50 is run into the well, any fluid that might be in the well flows upwardly therein and, upon reaching the insert device 10, passes through the fill-up tube 47, the flow capacity of which has been selected according to well conditions. Although the string of casing 50 fills as it is lowered, a certain amount of buoyancy occurs due to the fluid flow being restricted to some extent upon passing through the fill-up tube 47. Thus, the casing 50 is in effect "floated" into the well.

It is understood that, if desired, the device 10 may be employed as a float valve without including the fill-up tube 47 therein. That is, the basic device 10, as shown in FIGURE 1, may be inserted and set or expanded in the casing 50, whereupon the flapper valve 37 will be in its normally closed position during the running of the casing 50 into the well. With this optional arrangement, fluid present in the well will not enter the portion of the casing 50 above the device 10. However, fluid may be introduced into the upper portion of the casing 50 during the running-in operation, if desired, by supplying the fluid through the upper end of the casing 50 accessible at the surface of the well.

Where the fill-up tube 47 is present during the running-in operation, as shown in FIGURE 2, it will ordinarily be desirable to subsequently remove the tube 47, such as to permit further operations to be conducted.

Referring now to FIGURE 3, after the casing 50 has reached the desired depth in the well and has filled with fluid, an object such as a ball 51 of suitable size may be dropped downwardly therethrough to effect a seal on the top of the fill-up tube 47. In order to release the fill-up tube, pressure is applied to the fluid above the device 10, whereupon the ball 51 is forced downwardly through the passageway 36, shearing the flange 48 from the fill-up tube 47 and displacing the fill-up tube 47 out of the lower end of the body 11. After the ball 51 and the fill-up tube 47 have dropped out of the passageway 36, the flapper valve 37 is free to move to its normally closed position in sealing engagement with the surface 43 on the body 11.

It will be noted that the flapper valve 37 upon closing may be subsequently opened by the application of sufficient fluid pressure thereabove to overcome the spring 44, whereupon fluid is allowed to flow downwardly through the passageway 36. However, fluid flow in the reverse direction is not permitted due to the action of the spring 44 tending to maintain the flapper valve 37 in its closed position.

Referring now to FIGURE 4, the device 10 after removal of the fill-up tube 47, as aforesaid, may be employed to provide a seat for a bridging ball 52, such as where it is desired to treat a zone of the well opposite perforations or the like (not shown) provided in the casing 50 above the device 10. It will be noted that the ball 52 is of suitable diameter to seal on an upper end surface 53 of the body 11, which surface 53 surrounds the upper end of the passageway 36. The ball 52 may be dropped downwardly through the casing 50 to engage its seat provided by the surface 53, whereupon a seal is effected preventing fluid flow downwardly through the device 10.

It is understood that the bridging ball 52 of FIGURE 4 may be employed without first removing the fill-up tube 47 (shown in FIGURES 2 and 3), if this is ever desired. Also, the ball 52 may be employed, as desired, whether or not the fill-up tube 47 or the flapper valve 37 was present in the device 10 during the running of the casing 50 into the well.

Referring now to the arrangement of FIGURES 5 and 6, and first to FIGURE 5, the invention is there illustrated as being applied to a modified insert type valve device 60 which is adapted to be mechanically operated to securely mount it within a tubular member.

The device 60 is shown as including an overall body assembly made up of an upper body 61, an intermediate body 62 and a lower body 63. These are separate body parts which are adjustably positioned and assembled together by connecting means which includes a plurality of angularly spaced rods or studs 64.

As illustrated, each of the studs 64 has its upper end portion extended into an opening 65 provided therefor in the upper body 61 to which such end portion is threadedly connected. The studs 64 extend downwardly, passing through suitable non-threaded openings 66 and 67 provided, respectively, in the intermediate body 62 and the lower body 63, which are thus slidable along the studs 64. The lower portion of each stud 64 is suitably threaded and, below the lower body 63, is fitted with a threaded adjusting nut 68.

The arrangement is such that the adjusting nuts 68 may be rotated to change the relative positions of the upper body 61 and the lower body 63. For example, the nuts 68 may be rotated in a clockwise direction to reduce and in a counter-clockwise direction to increase the spacing between the bodies 61 and 63.

It will be noted that the upper body 61 has a downwardly and inwardly tapered exterior surface 69 while the intermediate body 62 has an upwardly and inwardly tapered exterior surface 70. The bodies 61 and 62 are suitably spaced apart to accommodate a set of segmental slips 71 disposed around the body assembly. The slips 71 preferably have both upwardly biting teeth 72 and downwardly biting teeth 73 on the exterior thereof. On the interior thereof, the slips 71 are provided with inwardly convergent tapered surfaces 74 and 75 which overlap and are companion surfaces, respectively, to the tapered surfaces 69 and 70 on the bodies 61 and 62.

The intermediate body 62 is counterbored from the lower end thereof or is otherwise suitably provided with a lower or skirt portion 76 which is adapted to slidably encircle the upper portion 77 of the lower body 63.

A resilient and expansible packing member or ring 78 encircles the upper portion 77 of the lower body 63 and is disposed thereon adjacent an upwardly facing surface or shoulder 79 which is provided on the body 63 above a lower raised portion thereof.

If desired, the shoulder 79 on the lower body 63 may be tapered upwardly and inwardly and the packing ring 78 at its lower end may be provided with a companion tapered surface 80, as shown. If desired, suitably tapered surfaces may also be provided at the upper end of the packing ring 78 and at the adjacent lower end of the intermediate body 62 and, in the arrangement shown, these surfaces are somewhat tapered.

It will be noted that a fluid passageway 81 extends axially through the overall body assembly, thus including aligned central openings suitably provided in bodies 61, 62 and 63. Fluid flow through the passageway 81 is controlled by fluid flow control means. In the arrangement of FIGURE 5, the fluid flow control means is a normally closed flapper valve 37a which is hingedly affixed to the lower body 63 and is adapted to seat thereon against a frusto-conical surface 82 surrounding the lower end of the passageway 81. The flapper valve 37a may be identical to the valve 37 hereinbefore described with reference to the arrangement of FIGURES 1 to 4 inclusive and, accordingly, will not be described in detail.

It will be noted in FIGURE 5 that the upper body 61 has a counterbore 83 extending into the passageway 81 from the upper end thereof. There is a circumferential recess 84 suitably located in the counterbore 83.

In FIGURE 6, the device 60 is shown fitted with an optional fill-up tube 47a which is releasably mounted in the passageway 81. The fill-up tube 47a and related parts may be identical to the tube 47 and related parts hereinbefore described with reference to the arrangement of FIGURES 1 to 4 inclusive and, accordingly, will not be described in detail.

It will be noted in FIGURE 6 that the device 60 is shown after being set or expanded in a section of well casing 50a. The operation of setting or expanding the device 60 may be accomplished by inserting it at the desired location and using any suitable tool (not shown) for rotating the adjusting nuts 68.

Rotation of the nuts 68 in one direction (for example, clockwise) results in movement thereof upwardly along the studs 64. This causes upward movement of the slidably mounted lower body 63 with the packing ring 78 thereon. Also, the slidably mounted intermediate body 62, due to engagement of the skirt portion 76 thereof with the packing ring 78, is caused to move upwardly along the studs 64.

Since the upper body 61 is in effect fixed with respect to the studs 64, continued rotation of the adjusting nuts 68, as aforesaid, reduces the spacing of the body 61 with respect to each of the bodies 62 and 63. Thus, the upper body 61 and intermediate body 62 move relatively toward each other, whereupon the tapered exterior surfaces 69 and 70 thereof are caused to slide, respectively, along companion tapered surfaces 74 and 75 in a direction such as to move the slips 71 radially outward into engagement with the surrounding casing 50a, as shown in FIGURE 6.

When the teeth 72 and 73 on the slips 71 are firmly engaged with the casing 50a, the intermediate body 62 is then substantially fixed against further upward movement along the studs 64. Continued rotation of the adjusting nuts 68 then deforms the packing ring 78 by compressing it between the lower end of the intermediate body 62 and the shoulder 79 provided on the lower body 63. Rotation of the nuts 68 is continued until the packing ring 78 is deformed or radially expanded into fluid-tight sealing engagement with the casing 50a.

It is understood that after the device 60 has been securely mounted within the section of casing 50a, as aforesaid, this casing section may then be coupled to other sections for running into a well, where the device 60 may be employed in various ways, including those hereinbefore mentioned with reference to the arrangement of FIGURES 1 to 4 inclusive.

Referring now to FIGURE 7, the invention is there illustrated as being applied to an arrangement suited for use between adjacent sections 85 and 86 of a string of casing or the like.

The casing sections 85 and 86 are shown coupled together by means of a collar 87 having internally threaded opposite end portions which are screwed, respectively, onto the externally threaded end portions of the adjacent sections 85 and 86.

It will be noted that upper casing section 85 has its lower end surface 88 disposed within the collar 87 in adjustably spaced relation to upper end surface 89 of the lower casing section 86. That is, the surfaces 88 and 89 provided, respectively, on the sections 85 and 86 are movable relative to each other by rotation of the collar 87.

If desired, the threads on the casing sections 85 and 86 and on the respective opposite end portions of the collar 87 may be selected whereby the collar 87 may be rotated with respect to both of the sections 85 and 86 at the same time to change the spacing between the end surfaces 88 and 89. However, where the casing sections 85 and 86 are of conventional design, the usual procedure will be to first rotate the collar 87 to screw it onto one of the sections, such as the lower section 86, prior to screwing together the collar 87 and the other section, such as the upper section 85.

It is convenient to consider the adjacent end portions of the casing sections 85 and 86 and also the collar 87 as being parts of a float valve device 90 which also includes an annular valve body 91 disposed within the collar 87.

The valve body 91 has a circumferential flange 92 preferably located equidistant from the upper and lower surfaces thereof. A circumferential recess 93 in the valve body 91 is located immediately above the flange 92. A resilient and expansible annular sealing member or ring 94 of preferably rectangular cross section is retained in the recess 93 adjacent the upper surface of the flange 92.

The diameter of the circumferential flange 92 on the body 91 is larger than the inside diameter of either of the casing sections 85 and 86 but is smaller, of course, than the inside diameter of the collar 87. The outside diameter of the sealing ring 94 is also larger than the inside diameter of either of the casing sections 85 and 86 and is preferably only slightly smaller than the inside diameter of the collar 87.

The flange 92 on the body 91 and also the sealing ring 94 are disposed within the collar 87 between the end surfaces 88 and 89 provided, respectively, on the casing sections 85 and 86. Thus, the valve body 91 may be mounted, as shown, by first screwing the collar 87, as aforesaid, at least partially onto one of the casing sections 85 or 86 and then inserting the body 91 prior to connecting the collar 87 to the other casing section.

In coupling together the casing sections 85 and 86, the sealing ring 94 is deformed by compressing it between the upper surface of the flange 92 and the lower end surface 88 of the upper casing section 85. Also, the lower surface of the flange 92 becomes tightly engaged with the upper end surface 89 of the lower casing section 86 as the collar 87 is rotated to move the end surfaces 88 and 89 relatively toward each other.

It will be noted that a fluid passageway 95 extends axially through the valve body 91. Fluid flow through the passageway 95 is controlled by fluid flow control means which, in the arrangement shown, is a normally closed flapper valve 37b. The flapper valve 37b is hingedly affixed to the body 91 and is adapted to seat thereon against a frusto-conical surface 96 surrounding the lower end of the passageway 95. The valve 37b may be identical to the flapper valve 37 hereinbefore described with reference to the arrangement of FIGURES 1 to 4 inclusive and, accordingly, will not be described in detail.

It will be noted that the body 91 has a counterbore 97 extending into the passageway 95 from the upper end thereof. There is a circumferential recess 98 suitably located in the counterbore 97 for receiving a lock ring, such as the ring 49 shown in FIGURE 2. The arrangement is preferably such as to permit an optional fill-up tube, such as the tube 47 of FIGURES 2 and 3, to be employed with the device 90 of FIGURE 7. Also, it is understood that upon the casing sections 85 and 86 being run into a well, the device 90 may be employed therein in various ways, including those hereinbefore described with reference to the arrangement of FIGURES 1 to 4 inclusive.

It is believed apparent from the foregoing description that the insert type devices 10, 60 and 90 of the various arrangements in the drawing accomplish the objects of the invention. In particular, the devices are independent of casing thread types, do not involve or require welding to the casing and have a multiplicity of uses without modification, being useful particularly as either a float valve, a fill-up device, or as a bridge plug or baffle.

Although the invention has been described with particular reference to specific embodiments thereof, it is understood that these are by way of illustration only, and that the invention should not be considered limited thereto. Accordingly, modifications are contemplated without departing from the scope of the invention, which is best defined in the appended claims.

We claim:
1. A well tool adapted to be inserted in a tubular member and run therewith into an oil or gas well or the like comprising an elongated body having an axial passageway extending therethrough, an upper expander fixed to said body, a lower expander slidable on said body, slip means encircling said body between said upper and lower expanders, said slip means having surfaces cooperable with said upper and lower expanders to move said slip means into holding engagement with said tubular member upon movement of said upper and lower expanders toward each other, a slidable sleeve encircling a portion of said body below said lower expander, flexible packing means disposed on said body between said sleeve and said lower expander, means forming a sealed chamber between said sleeve and said body, the body having an axial passage therein communicating with said sealed chamber and with the lower end of the body, and means including a pressure-responsive normally closed check valve mounted on the lower end of the body for supplying fluid under pressure through said axial passage to said sealed chamber, said sleeve being responsive to fluid pressure in said chamber and being adapted to move toward said lower expander upon sufficient fluid under pressure being supplied to said chamber.

2. A well tool adapted to be inserted in a tubular member and run therewith into an oil or gas well or the like comprising an elongated body having an axial passageway extending therethrough, normally closed valve means for controlling the flow of fluid through said passageway, an upper expander fixed to said body, a lower expander slidable on said body, slip means encircling said body between said upper and lower expanders, said slip means having upwardly and downwardly biting exterior teeth and having interior surfaces cooperable with said upper and lower expanders to move said slip means into holding engagement with said tubular member upon movement of said lower expander relatively toward said upper expander, a slidable sleeve encircling a portion of said body below said lower expander, flexible packing means slidably mounted on said body between said sleeve and said lower expander, said packing means being deformable into sealing engagement with said tubular member upon movement of said sleeve relatively toward said lower expander, means forming a sealed chamber between said sleeve and said body, the body having an axial passage therein communicating with said sealed chamber and with the lower end of the body, and means including a pressure-responsive normally closed check valve mounted on the lower end of the body for supplying hydraulic fluid under pressure through said axial passage to said sealed chamber, said sleeve being responsive to fluid pressure in said chamber and being adapted to move upwardly along said body upon sufficient hydraulic fluid under pressure being supplied to said chamber.

3. In a well tool adapted to be inserted in a tubular member and lowered therewith into a well, comprising in combination: an elongated body having an axial passageway extending therethrough, flexible packing means encircling said body and adapted to be expanded laterally into contact with the tubular member to effect a seal between said body and the tubular member, rigid means on said body engageable with said tubular member to prevent relative axial movement of said body therein, a sleeve axially movable on said body and having a portion engaging said flexible packing means, means forming a sealed chamber between said sleeve and said body, the body having an axial passage therein communicating with said sealed chamber and with the lower end of the body, and means including a pressure-responsive normally closed check valve mounted on the lower end of the body for supplying fluid under pressure through said axial passage to said sealed chamber, said sleeve being responsive to fluid pressure in said chamber to move toward said flexible packing means to expand it laterally.

References Cited in the file of this patent
UNITED STATES PATENTS

| | | |
|---|---|---|
| 1,574,537 | Burch | Feb. 23, 1926 |
| 1,690,536 | Hartman | Nov. 6, 1928 |
| 2,139,983 | Stone | Dec. 13, 1938 |
| 2,153,812 | Newton | Apr. 11, 1939 |
| 2,231,282 | Norris | Feb. 11, 1941 |
| 2,382,455 | Turechek | Aug. 14, 1945 |
| 2,630,865 | Baker | Mar. 10, 1953 |
| 2,751,021 | Muse | June 19, 1956 |
| 2,762,436 | Brown | Sept. 11, 1956 |
| 2,842,212 | Lebourg | July 8, 1958 |
| 2,855,003 | Thaxton | Oct. 7, 1958 |
| 2,870,794 | Thaxton | Jan. 27, 1959 |
| 2,942,666 | True et al. | June 28, 1960 |
| 2,946,388 | Evans | July 26, 1960 |
| 2,982,358 | Brown | May 2, 1961 |
| 3,013,612 | Angel | Dec. 19, 1961 |